(12) United States Patent
Chloupek et al.

(10) Patent No.: US 7,106,567 B2
(45) Date of Patent: Sep. 12, 2006

(54) HARD DISK DRIVE (HDD) ELECTRICAL OVER VOLTAGE STRESS (EOS) SYSTEMS AND METHODS

(75) Inventors: James E. Chloupek, Plano, TX (US); Robert E. Whyte, Jr., Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/703,720

(22) Filed: Nov. 6, 2003

(65) Prior Publication Data

US 2004/0095815 A1 May 20, 2004

Related U.S. Application Data

(62) Division of application No. 09/735,013, filed on Dec. 12, 2000, now abandoned.

(51) Int. Cl.
*H02H 3/20* (2006.01)
*H02H 3/26* (2006.01)

(52) U.S. Cl. ............... 361/91.1; 361/91.2; 361/91.5; 361/91.6; 361/84; 361/245; 361/246

(58) Field of Classification Search ............... 710/302, 710/301, 62; 361/91.1, 84, 245, 246, 91.2, 361/91.5, 91.6
See application file for complete search history.

(56) References Cited

U.S. PATENT DOCUMENTS

| | | | | |
|---|---|---|---|---|
| 5,587,685 A | * | 12/1996 | Johansson | 327/546 |
| 5,774,315 A | * | 6/1998 | Mussenden | 361/18 |
| 5,815,356 A | * | 9/1998 | Rodriguez et al. | 361/91.6 |
| 5,930,096 A | * | 7/1999 | Kim | 307/75 |
| 6,278,598 B1 | * | 8/2001 | Suzuki et al. | 361/93.9 |
| 6,308,233 B1 | * | 10/2001 | Park | 710/302 |
| 6,771,478 B1 | * | 8/2004 | Ochi | 361/118 |

* cited by examiner

*Primary Examiner*—Tanh Q. Nguyen
(74) *Attorney, Agent, or Firm*—W. James Brady; Frederick J. Telecky, Jr.

(57) ABSTRACT

The present invention relates to a hard disk drive system having overvoltage protection circuits for various types of overvoltage conditions. For example, the system includes one or more hard disk drive integrated circuit chips residing on a board and a hard disk drive power plug receptacle residing on the board having two different value power supply ports associated therewith. The receptacle is operable to receive a power plug therein, wherein when the power plug is inserted therein in a proper orientation the two different value voltages are properly supplied to the one or more hard disk drive integrated circuit chips, and wherein when the power plug is inserted therein in an improper orientation the two different value voltages are switched with respect to their intended values.

6 Claims, 8 Drawing Sheets

HARD DISK DRIVE (HDD) ELECTRICAL OVER VOLTAGE STRESS (EOS) SYSTEMS AND METHODS

This application is a division of application Ser. No. 10/449,240, filed May 30, 2003, now abandoned, which is a division of application Ser. No. 09/735,013, filed Dec. 12, 2000, now abandoned.

FIELD OF THE INVENTION

The present invention relates to electronic circuits and, more particularly, to a circuit, system, structure and method for reducing or otherwise eliminating electrical over voltage stress (EOS) related failures in hard disk drive (HDD) systems and boards as discussed, and in addition, other memory storage devices such as floppy disk drives, removable hard disk drives, tape drives, CD drives, and DVD drives.

BACKGROUND OF THE INVENTION

Hard disk drives such as the exemplary drive 10 illustrated in FIG. 1a include one or a stack of magnetically coated platters 12 that are used for storing information. The magnetically coated platters 12 are mounted together in a stacked position through a spindle 14 which may be referred to as a platter stack. The platter stack is typically rotated by a motor that is referred to as a spindle motor or a servo motor (not shown). A space is provided between each platter to allow an arm 18 having a read/write head or slider 20 associated therewith to be positioned on one or both sides of each platter 12 so that information may be stored and retrieved. Information is stored on one or both sides of each platter 12 and is generally organized into sectors, tracks, zones, and cylinders.

Each of the read/write heads or sliders 20 are mounted to one end of the dedicated suspension arm 18 so that each of the read/write heads may be positioned as desired. The opposite end of each of the suspension arms 18 are coupled together at a voice coil motor 16 (VCM) to form one unit or assembly (often referred to as a head stack assembly) that is positionable by the voice coil motor. Each of the suspension arms 18 are provided in a fixed position relative to each other. The voice coil motor 16 positions all the suspension arms 18 so that the active read/write head 20 is properly positioned for reading or writing information. The read/write heads 20 may move from at least an inner diameter to an outer diameter of each platter 12 where data is stored. This distance may be referred to as a data stroke.

Hard disk drives also include a variety of electronic circuitry 30 for processing data and for controlling its overall operation as illustrated in FIG. 1b. This electronic circuitry 30 may include a pre-amplifier 32, a read channel/write channel circuit 33, a servo controller 34, a motor control circuit 35, a read-only memory 36 (ROM), a random-access memory 37 (RAM), and a variety of disk control circuitry such as an HDD controller 38 or microprocessor to control the operation of the hard disk drive and to properly interface the hard disk drive to a system bus 39, and voltage regulators to supply voltages needed other than the ones from the power plug. The pre-amplifier 32 may contain a read pre-amplifier and a write pre-amplifier that is also referred to as a write driver. The pre-amplifier 32 may be implemented in a single integrated circuit or in separate integrated circuits such as a read pre-amplifier and a write pre-amplifier or write driver. The disk control circuitry 38 generally includes a separate microprocessor for executing instructions stored in memory to control the operation and interface of the hard disk drive.

Hard disk drives perform write, read, and servo operations when storing and retrieving data. The preamplifier circuit IC is located proximate to the arms 18 and a flex 50 is used to couple the signals back and forth to the remaining circuitry on a printed circuit board (PCB) 52 (see, e.g., FIG. 2b). The PCB 52 contains the remaining circuitry of FIG. 1b and receives power from a power plug into a receptacle. An exemplary plan view of a plug receptacle or socket is illustrated in FIG. 2c, and designated at reference numeral 54. The non-portable PC industry standard socket 54 will comprise a four pin male type connector for providing supply voltage potentials of 5V, GND, GND and 12V, respectively, to the PCB circuitry.

The non-portable PC industry standard socket 54 further includes two 45 degree filled corner tabs 56 which serve as a key to discourage plugging a power plug into the socket 54 in the wrong way, for example, reversing the plug. Unfortunately, in some cases it is still possible to force the power plug into the socket 54 in an improper orientation if sufficient force is exerted on the power plug. In such cases, the 5V and 12V supply voltages are switched, and circuitry intended to receive 5V may receive 12V, which may result in an electrical overvoltage stress (EOS) related circuit failure.

The 5V only or 3.3V only (no 12V) HDDs for portable PCs use a different power plug configuration. In the non-portable use, a 5V HDD with a different plug configuration may use a socket adapter to the non-portable industry standard socket 54, and there the possibility of reverse plugging the socket adapter still exists.

In addition, the circuitry on the PCB 52 is powered by system power supplies not located thereon which may not be adequately regulated or, in some cases, may be defective. Such system conditions may result in overvoltage conditions at either or both of the 5V and 12V pins, respectively, even when the power plug is properly inserted into the socket 54. Such overvoltage conditions may also contribute to EOS related circuit failures.

SUMMARY OF THE INVENTION

The present invention relates generally to circuitry for protecting hard disk drive systems from undesirable voltage conditions due to, for example, a reverse power plug condition or an unregulated or otherwise malfunctioning power supply. For example, FIGS. 3 and 5 are two different implementations of V5 protection; and FIGS. 6 and 7 are two different implementations of V12 protection. Each of these implementations provide different levels of protection and V5 and V12 protection may be implemented together or independently of one another, as may be desired.

According to one aspect of the present invention, a hard disk drive protection system comprises a reverse power plug orientation protection circuit (see, e.g., FIG. 3). The protection circuit is operable to detect an improper orientation of a power plug in a power plug receptacle or socket on a hard disk drive printed circuit board. Upon detection of the improper orientation, the protection circuit is further operable to reduce the voltage provided to a circuit board trace which is intended to carry a relatively low power supply potential to one or more integrated circuit chips on the board. In the above manner, an overvoltage condition associated with an improperly oriented power plug is mitigated or otherwise eliminated.

According to another aspect of the present invention, the reverse power plug orientation circuit comprises a variable resistance circuit which is operable to vary a resistance associated therewith as a function of the power plug orientation. For example, when the power plug is properly inserted into the power plug socket (see, e.g., FIG. 4a), the variable resistance circuit approximates a short circuit with negligible resistance to substantially pass a supply voltage to associated hard disk drive components on the printed circuit board. Alternatively, when the power plug is reversed and improperly oriented within the power plug socket (see, e.g., FIG. 4b), the variable resistance circuit exhibits a substantial resistance, thereby causing a substantial voltage drop thereacross and thus reduces a voltage which is passed to hard disk drive components on the printed circuit board. Consequently, an overvoltage condition associated with a reversed power plug is mitigated or eliminated altogether.

According to another aspect of the present invention, the variable resistance circuit comprises a transistor having a control terminal coupled to a pin associated with the high supply voltage potential when the power plug is properly oriented in the socket and another terminal coupled to a pin associated with a low supply voltage potential when the power plug is properly oriented. Under normal conditions, the high supply potential activates the transistor causing it to approximate a short circuit. Under adverse conditions when the power plug is improperly oriented in the power plug, the supply potentials are switched and the low supply potential is coupled to the transistor control terminal, thereby decreasing the conduction and increasing the resistance thereof. Consequently, the high supply potential present at the transistor is reduced thereacross, thus preventing the high potential from being transmitted undesirably to one or more circuit components on the hard disk drive printed circuit board.

According to still another aspect of the present invention, an overvoltage protection circuit (see, e.g., FIG. 5) is disclosed which is operable to prevent circuit damage due to reverse plugging or an unregulated or defective 5V power supply in a hard disk drive system. The overvoltage protection circuit comprises a voltage detection circuit which is operable to monitor a voltage associated with the low supply voltage, and output an activation signal when the voltage associated therewith exceeds a predetermined level. The overvoltage protection circuit further comprises a voltage reduction circuit operably coupled to the voltage detection circuit, and operable to reduce a value of the low supply voltage upon receipt of the activation signal from the voltage detection circuit. Upon activation, the voltage reduction circuit increases a resistance in a transmission path between the low voltage supply and the hard disk drive components, thereby generating a voltage drop there across and reducing the voltage seen at the system components.

According to yet another aspect of the present invention, the voltage detection circuit comprises a zener diode in series with a resistor. When the low supply voltage exceeds a predetermined level, the reverse biased zener diode reaches its zener breakdown voltage and breaks down, causing current to conduct therethrough. The current conduction causes a voltage drop to occur across the resistor which is then used as an activation signal to indicate that an overvoltage condition has been detected.

According to still another aspect of the present invention, the voltage reduction circuit (see, e.g., FIG. 6) comprises a transistor having a control terminal coupled to the voltage detection circuit. Upon detection of an overvoltage condition of the 12V power supply, an activation signal from the voltage detection circuit causes the transistor to turn on. The transistor is connected to a control terminal of another transistor which is within the transmission path between the supply voltage being monitored and the hard disk drive components. When the first transistor turns on, the voltage and the control terminal of the second transistor in the transmission path goes low, causing it to become more resistive. The increased resistance in the transmission path results in a reduced voltage at the hard disk drive components, thereby reducing failures associated with electrical overstress (EOS) conditions.

According to still another aspect of the present invention, an overvoltage protection circuit (see, e.g., FIG. 7) is disclosed which is operable to prevent circuit damage due to an unregulated or defective 12V power supply in a hard disk drive system. The overvoltage protection circuit comprises a voltage detection circuit which is operable to monitor a voltage associated with the high supply voltage, and output an activation signal when the voltage associated therewith exceeds a predetermined level. The overvoltage protection circuit further comprises a voltage reduction circuit operably coupled to the voltage detection circuit, and operable to reduce a value of the high supply voltage upon receipt of the activation signal from the voltage detection circuit. Upon activation, the voltage reduction circuit increases a resistance in a transmission path between the high voltage supply and one or more of the hard disk drive components, thereby generating a voltage drop thereacross and reducing the voltage seen at the one or more system components.

According to yet another aspect of the present invention, the voltage reduction circuit uses a pass FET already associated with the hard disk drive system to reduce the voltage when a voltage associated with the high voltage supply exceeds a predetermined threshold. When an overvoltage condition is detected, the pass FET becomes less conducting or more resistive, thereby causing a voltage drop thereacross and reducing the value associated with the first supply voltage at the trace. In addition, a second transistor may be configured in series with the pass FET such that backgate diodes associated therewith and the pass FET are oriented in a back-to-back configuration. Such back-to-back backgate diodes prevent conduction therethrough under large overvoltage conditions associated with the first supply voltage.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The present invention relates to a system and circuitry for preventing overvoltage conditions on a hard disk drive printed circuit board.

Figure 1A:
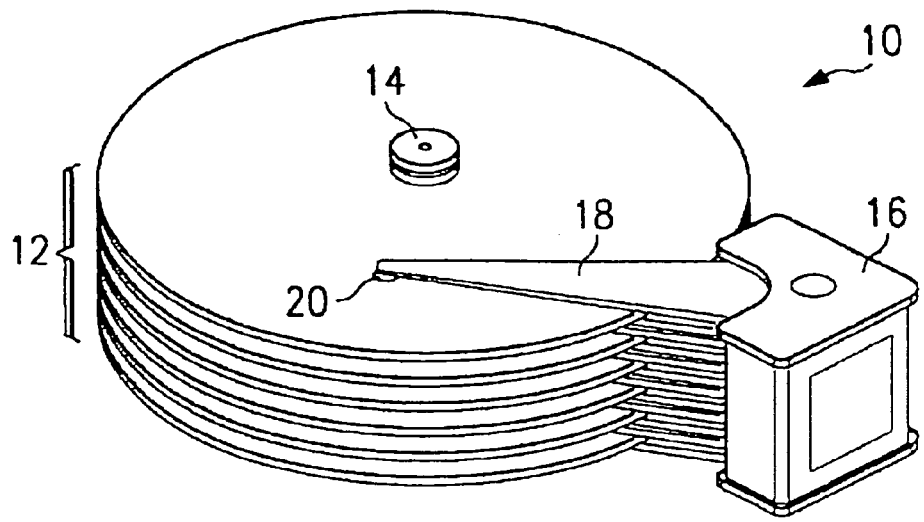
FIG. 1a is a perspective view of a prior art disk drive mass storage system.
Figure 1B:
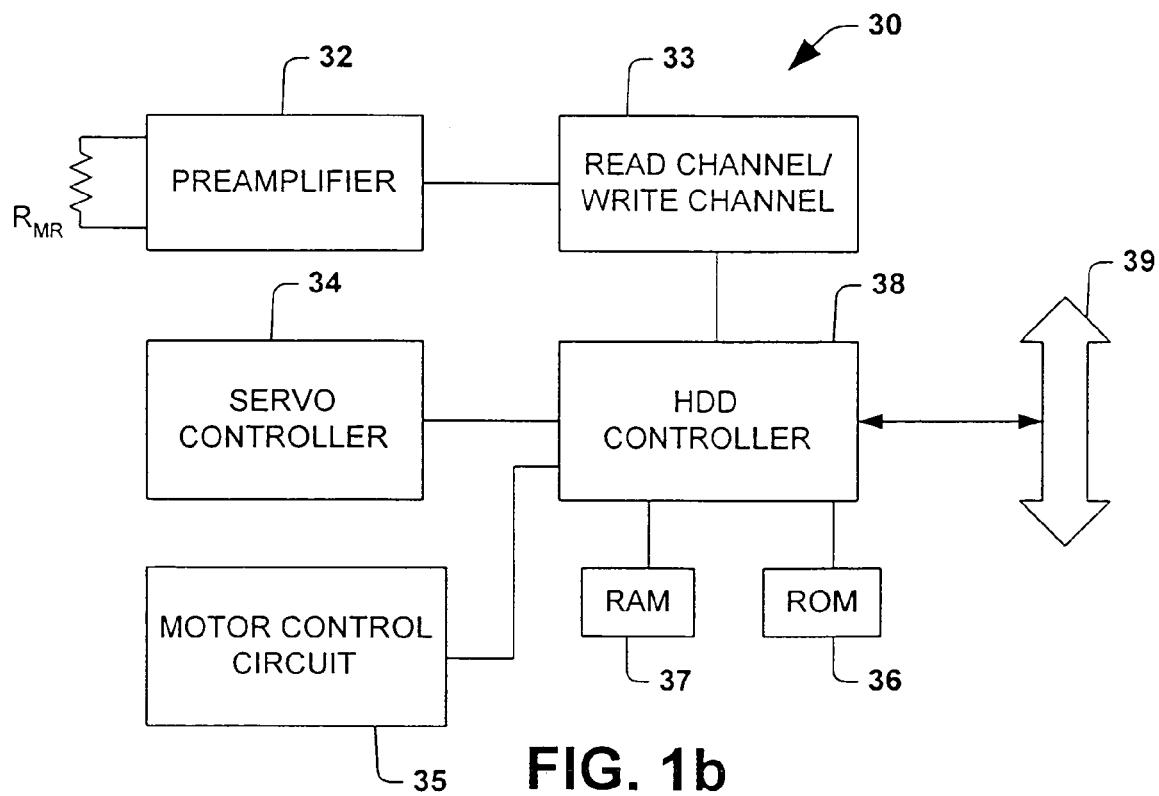
FIG. 1b is a schematic diagram illustrating circuitry associated with a disk drive mass storage system.
Figure 2A:
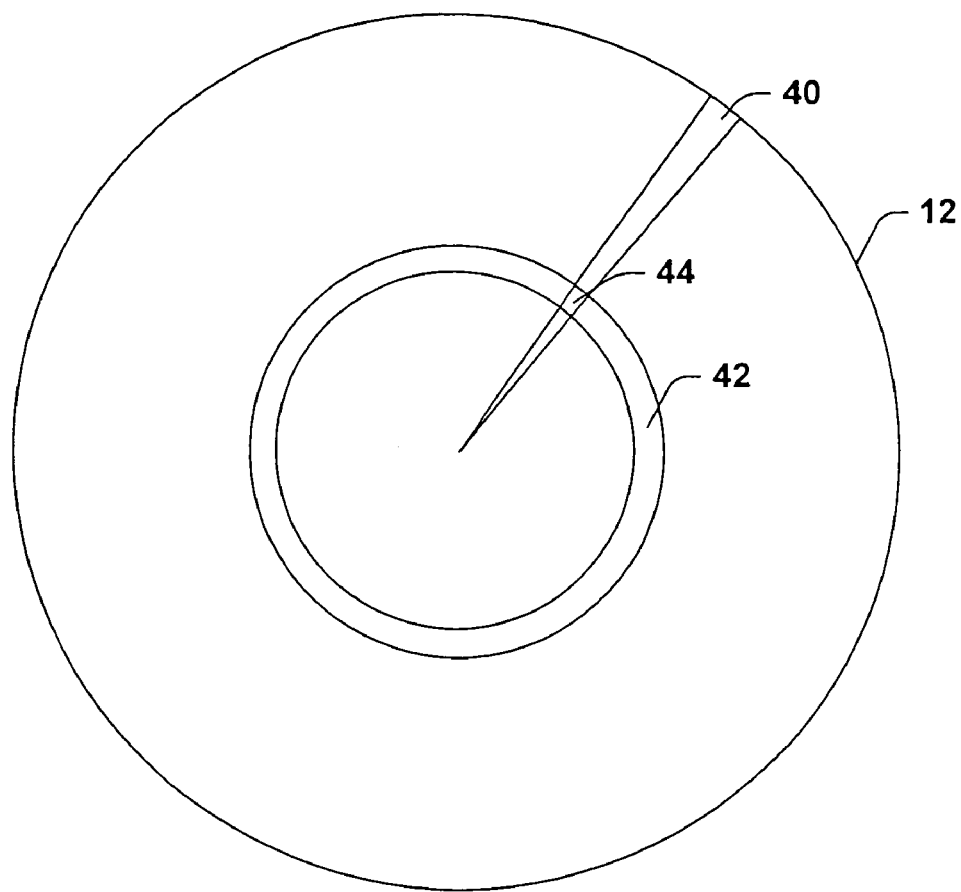
FIG. 2a is a plan view illustrating a platter having a servo wedge associated therewith for use in positioning a read/write head accurately thereon.
Figure 2C:
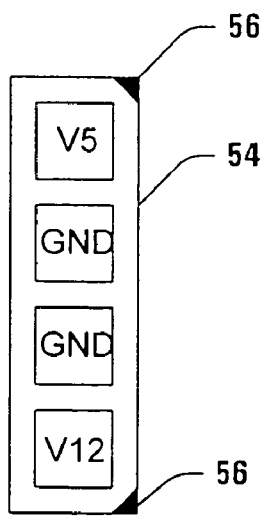
FIG. 2c is a plan view of a power plug receptacle or socket having a key portion for guiding a power plug orientation associated therewith.
Figure 2B:
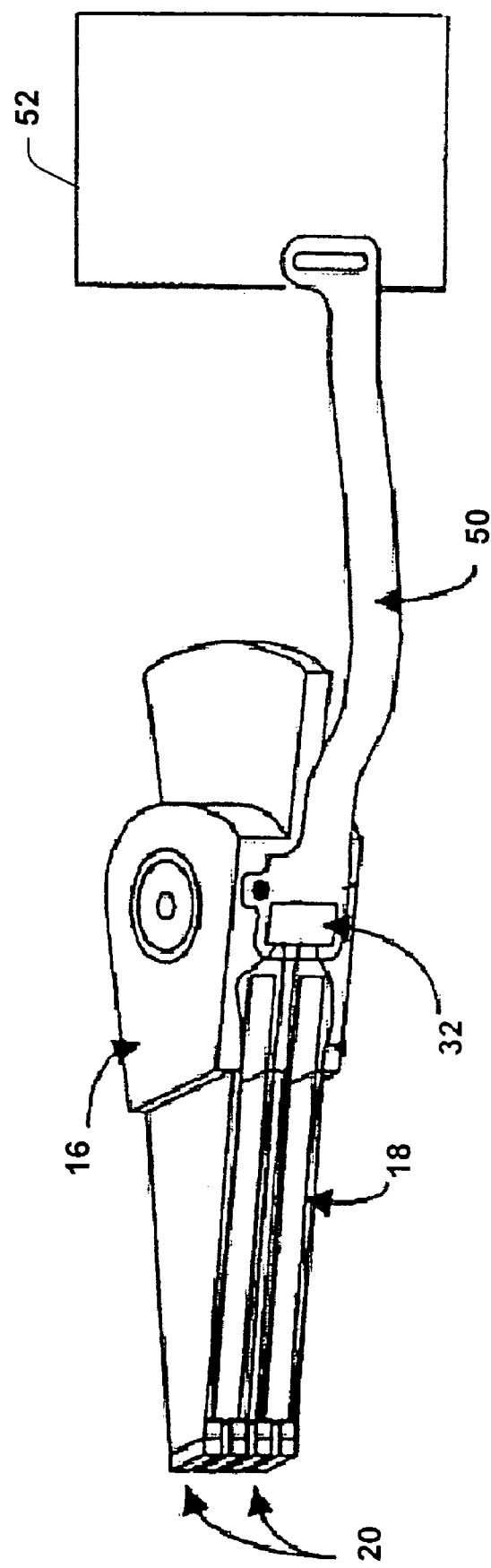
FIG. 2b is a perspective view of a portion of a disk drive system illustrating the circuitry associated with the disk drive mass storage system.
Figure 3:
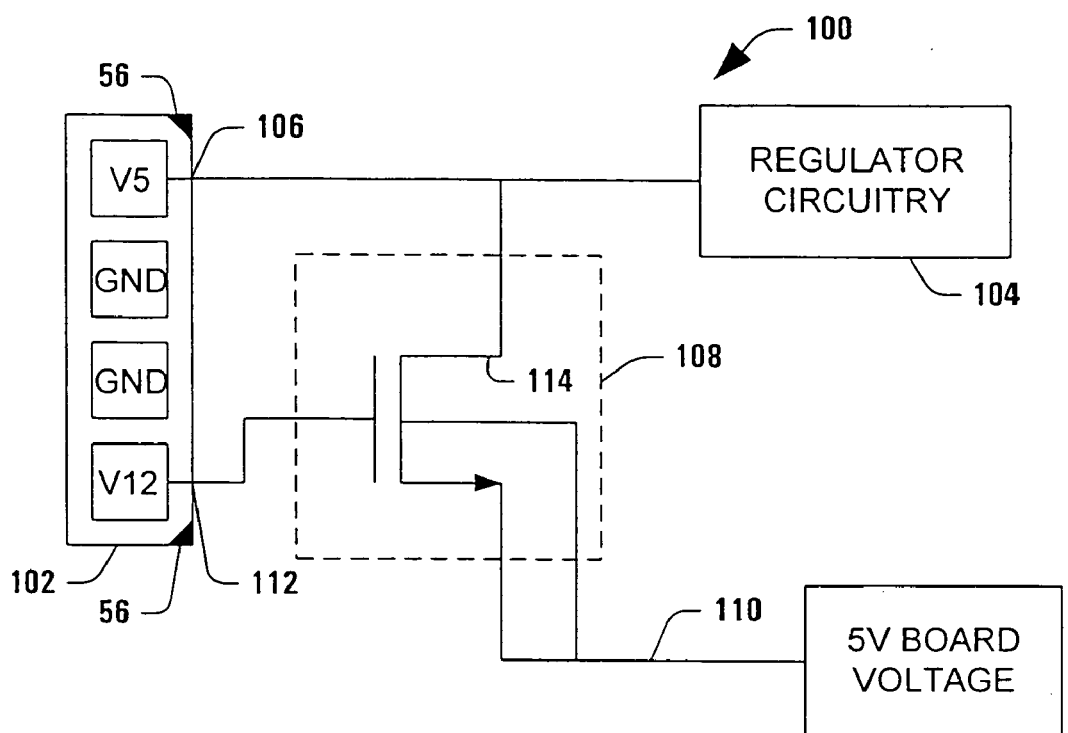
FIG. 3 is a schematic diagram illustrating a reverse plug orientation protection circuit according to one aspect of the present invention.

Turning now to the figures, FIG. 3 is a combined block level and schematic diagram illustrating an electrical over stress protection system 100 according to one exemplary aspect of the present invention. The system 100 may reside on a hard disk drive printed circuit board (PCB) which includes a hard disk drive power plug receptacle or socket 102. According to one exemplary aspect of the present invention, the non-portable PC industry standard receptacle or socket 102 is a four pin male type adapter having a pin for a high, first supply voltage value (e.g., about 12V), two pins for circuit ground potential value, and a pin for the second, low supply voltage value (e.g., about 5V), respectively. Regulator circuitry 104 may be coupled to a fourth pin 106 of the adapter 102 to provide voltage regulation for the other supply voltages used within the PCB. A reverse plug orientation protection circuit 108 is coupled between the adapter 102 and other hard disk drive board components (e.g., integrated circuit chips) via one or more supply voltage traces 110. The protection circuit, according to one exemplary aspect of the present invention, is also coupled to the first supply voltage value via a first pin 112 of the adapter 102.

According to an exemplary aspect of the present invention, the protection circuit 108 is operable to detect an improper orientation of a power plug when inserted into the receptacle or socket adapter 102 and then reduce a voltage value at the one or more traces 110 in response to the detection. For example, the protection circuit 108 may comprise a variable resistor circuit which is operable to adjust a resistance value associated therewith based on the orientation of a power plug in the power plug socket 102.

Under normal operating conditions when the power plug is properly oriented in the socket 102, the variable resistance circuit exhibits substantially no resistance and approximates a short circuit to pass the second supply voltage value to the trace 110 without a substantial voltage drop thereacross. Under other conditions, however, when the power plug is reversed and plugged into the socket 102 in an improper orientation, the variable resistance circuit exhibits a substantial resistance, thereby causing a voltage drop thereacross to thereby prevent an undesirable high voltage value form appearing on the one or more traces 110.

Figure 4A:
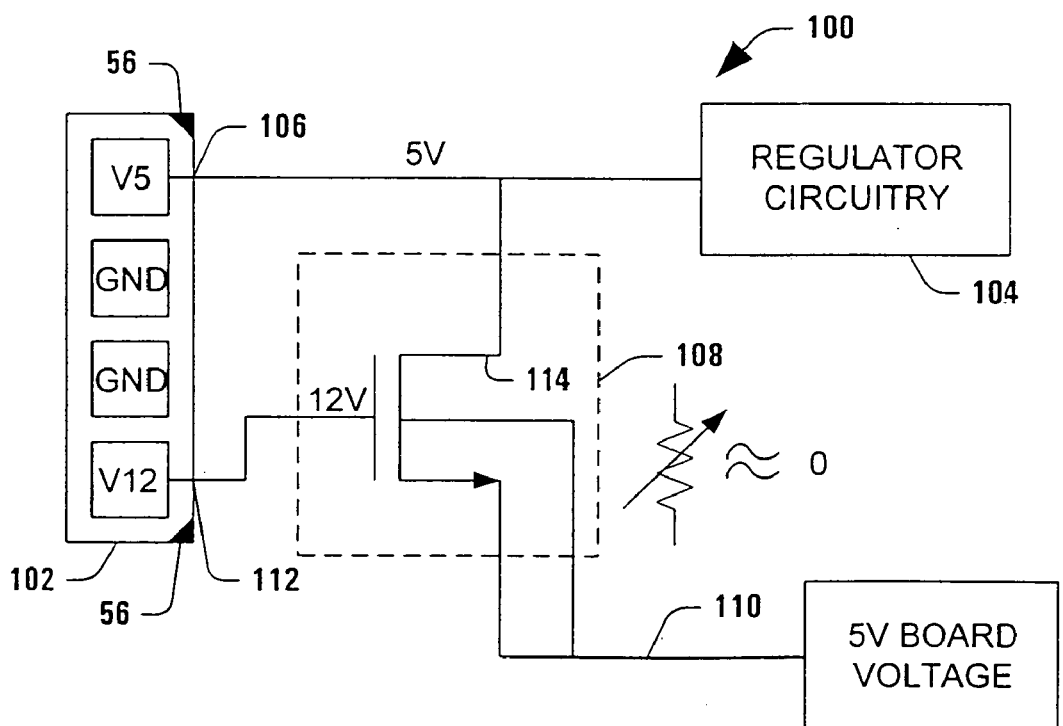
FIG. 4a is a schematic diagram illustrating the protection circuit of FIG. 3 under normal power plug orientation conditions.
Figure 4B:
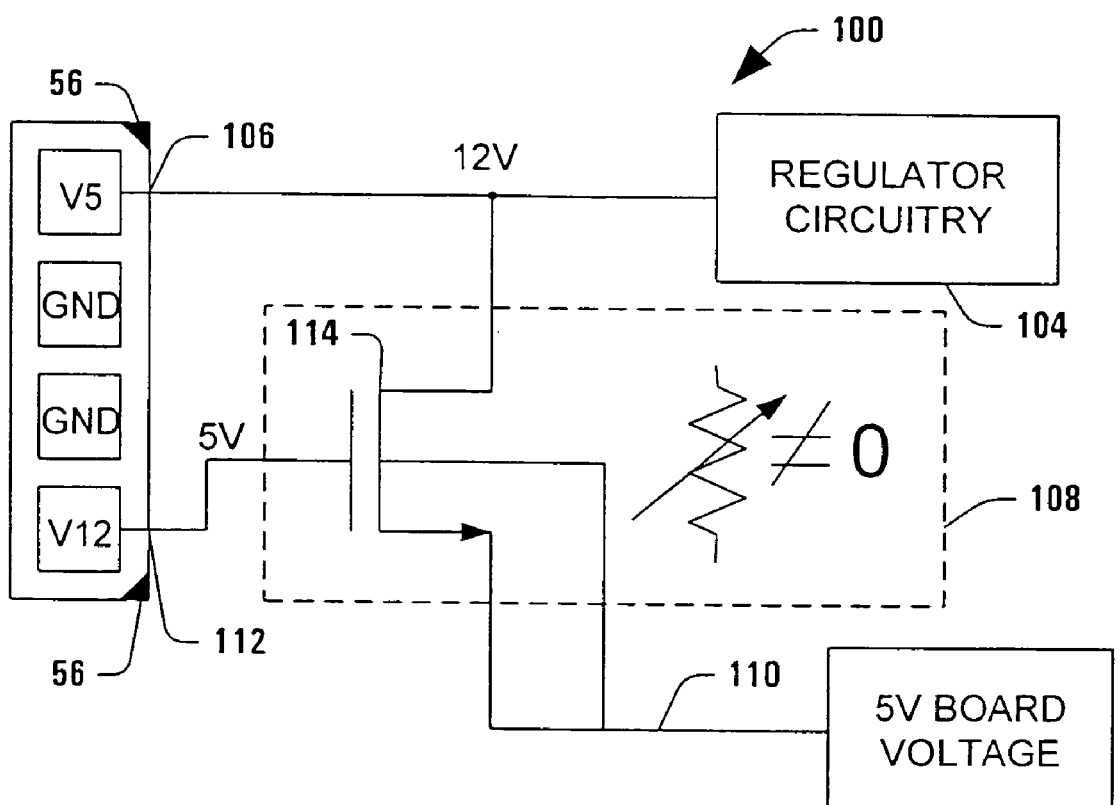
FIG. 4b is a schematic diagram illustrating the protection circuit of FIG. 3 under adverse conditions where the power plug orientation in the socket has been reversed.

Any type of circuitry which may provide the above functionality may be utilized as the protection circuit 108, and such variations are contemplated as falling within the scope of the present invention. For example, according to one aspect of the present invention, the protection circuit 108 comprises a transistor such as an NMOS transistor 114 as illustrated in FIG. 3. In operation, the transistor works as follows, as illustrated in FIGS. 4a and 4b, respectively. In FIG. 4a, the power plug is inserted into the socket 102 in the proper orientation such that the first supply voltage value is provided to the first pin 112 (e.g., 12V) and the second supply voltage value is provided to the fourth pin 106 (e.g., 5V), respectively. As seen in FIG. 4a, this results in 12V being applied to a control terminal (e.g., a gate) of the transistor 114, causing it to substantially turn on (e.g., full conductance). In such a state, the transistor 114 approximates a short circuit and almost all of the 5V is passed from the fourth pin 106 of the socket 102 to the one or more traces 110.

Alternatively, when the power plug is inserted into the socket 102 in an improper orientation, the first and second supply voltage values are switched on the pins 106 and 112, as illustrated in FIG. 4b. That is, the higher voltage (e.g., 12V) now appears on the fourth pin 106 and without the help of the transistor 114, would result in a high and potentially damaging voltage appearing on the one or more traces 110 which go to various circuit components on the board. However, according to the present invention, the transistor 114 now has the lower voltage value (e.g., 5V) on its gate terminal, thus causing the conductance thereof to be substantially diminished. That is, the resistance associated with the transistor 114 is substantial and therefore a significant voltage drop (ΔV>0V) will occur across the transistor 114, thereby reducing the voltage on the one or more traces 110 (e.g., ΔV is equal to about 7–8V, thus leaving about 4V at the trace 110.).

Figure 5:
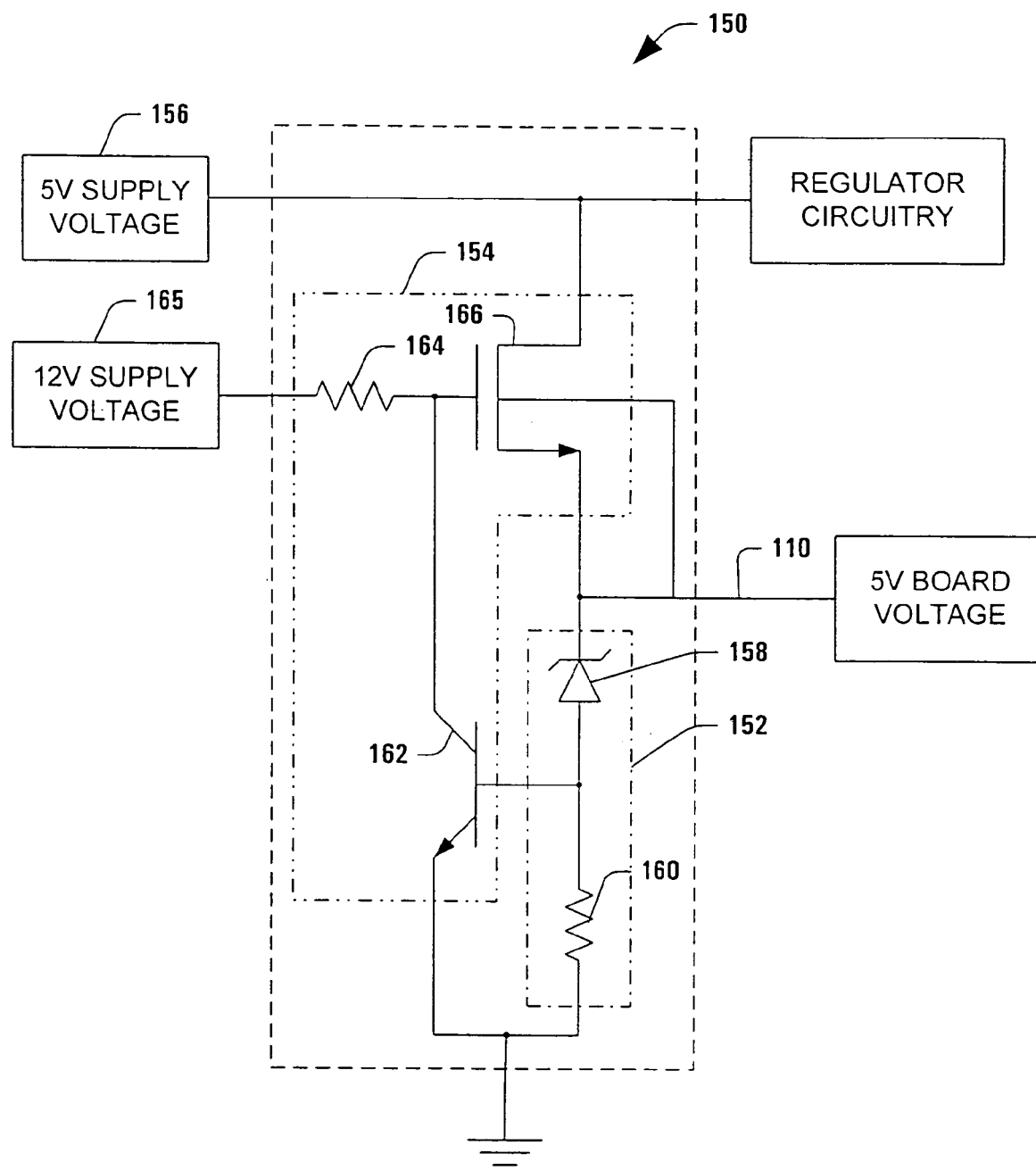
FIG. 5 is a schematic diagram illustrating a reverse plug orientation and an overvoltage protection circuit associated with a low voltage power supply according to another aspect of the present invention.

According to another aspect of the present invention, a reverse plug orientation and an overvoltage protection circuit is disclosed, as illustrated in FIG. 5 and designated at reference numeral 150. The overvoltage protection circuit 150 is operable to reduce the voltage at the 5V board trace 110 under system conditions when the 5V supply voltage exceeds its rated voltage (e.g., increasing substantially above 5V) due to, for example, an unregulated or defective 5V supply. According to one exemplary aspect of the present invention, the overvoltage protection circuit 150 comprises a voltage detection circuit 152 and a voltage reduction circuit 154, respectively. The voltage detection circuit 152 is operable to detect a circuit condition in which the potential of a 5V supply 156 exceeds a predetermined level, for example, some value greater than 5V. Upon detection of such a circuit condition, the voltage detection circuit 152 provides an activation signal to the voltage reduction circuit 154 which is operable to reduce the voltage associated with the 5V supply 156 at the trace 110 which supplies the supply potential to at least one of the various integrated circuit chips on the hard disk drive printed circuit board.

In accordance with one exemplary aspect of the present invention, the voltage detection circuit 152 may comprise a zener diode 158 in series with a resistor 160. In operation, under normal conditions when the supply voltage is about 5V, the voltage across the zener diode 158 is reverse biased and the diode 158 is nonconducting. Under an overvoltage condition, however, where the potential of the 5V supply 156 exceeds substantially its rated voltage, the zener diode is reverse biased and breaks down (e.g., by setting the zener breakdown voltage at about the predetermined level which is greater than 5V) and current conducts therethrough. Based upon the breakdown current, the resistor 160 develops a voltage thereacross which serves as an activation signal that an overvoltage condition has been detected. Although the zener diode and resistor combination has been illustrated and described as one type of voltage detection circuit, other types of circuits may be employed to provide similar voltage detection functionality and such alternative circuitry is contemplated as falling within the scope of the present invention.

In accordance with another exemplary aspect of the present invention, the voltage reduction circuit 154 may comprise a transistor 162 such as an NPN type bipolar transistor having a control terminal coupled to the voltage detection circuit 152. The voltage reduction circuit 154 also may include a resistor 164 coupled in series between another, higher value voltage supply 165 (e.g., a 12V supply) and a control terminal of another transistor 166, for example, an NMOS transistor. Under normal operating conditions, no activation signal is provided by the voltage detection circuit 152 to the voltage reduction circuit 154, and thus the NPN transistor 162 is off. With no current conduction through transistor 162, the resistor 164 conducts substantially no current and passes effectively the voltage potential of the supply 165 to the gate of the transistor 166. With the gate of the transistor 166 being high, the transistor 166 is conducting and the 5V supply potential is transmitted substantially to the trace(s) 110.

Under a detected overvoltage condition, however, the voltage detection circuit 152 provides an activation signal to the base of the transistor 162, thus turning the transistor 162 on and initiating current conduction therethrough. As current conducts through the NPN transistor base 162, a voltage drop occurs across the resistor 164 due to the current conduction therethrough, thus causing the gate voltage of the NMOS transistor 166 to decrease, resulting in decreased current conduction through the transistor 166. As the NMOS transistor 166 becomes more resistive, a voltage drop occurs thereacross, thereby decreasing the voltage supplied by the 5V supply 156 to the trace(s) 110. In the above manner, the voltage reduction circuit 152 operates to reduce the voltage at the trace(s) 110 when an overvoltage condition at the supply 156 is detected. Although FIG. 5 illustrates one exemplary voltage reduction circuit, various types of other circuit components and configurations may be employed to provide such functionality and such alternative circuits are contemplated as falling within the scope of the present invention.

Figure 6:
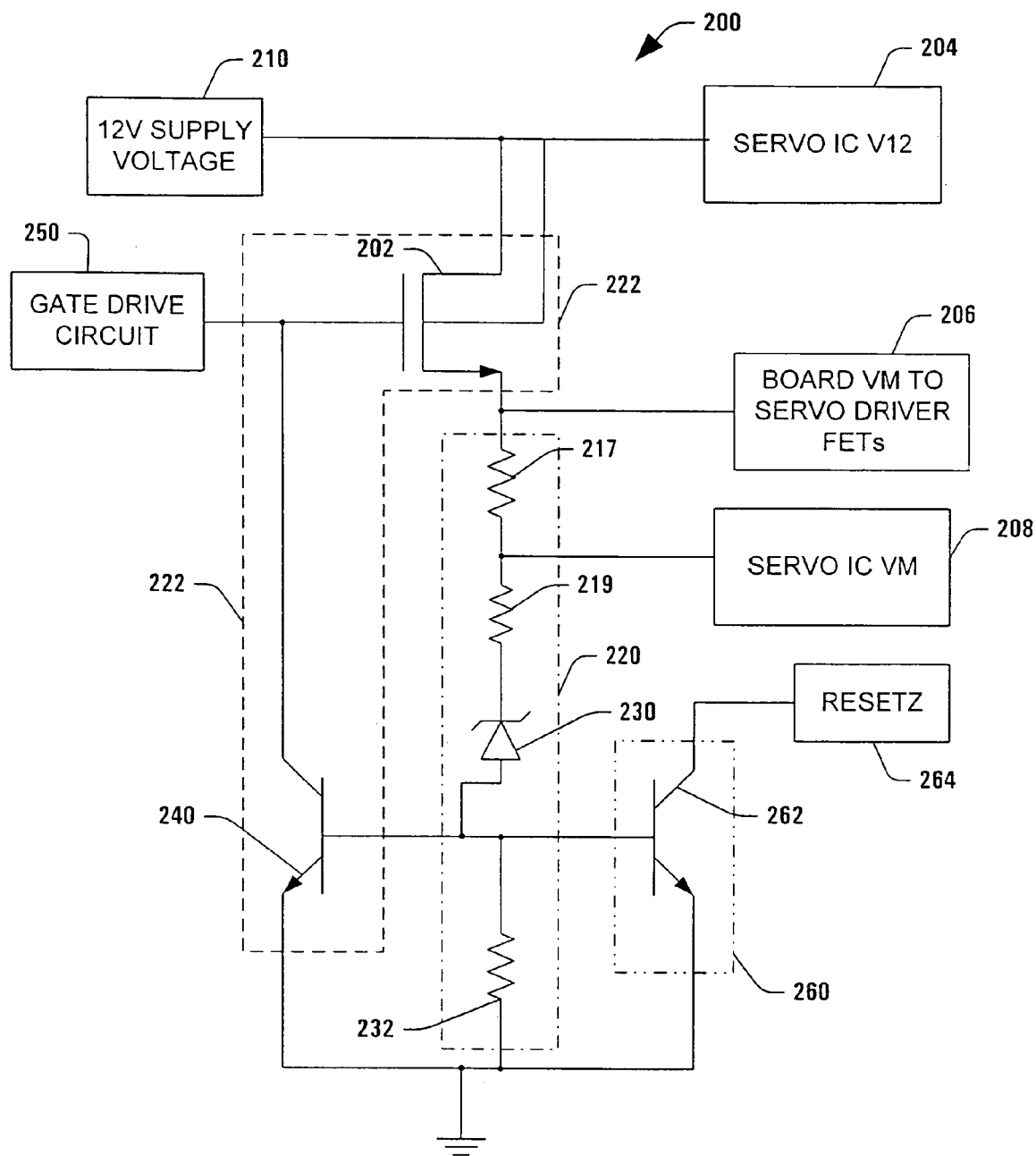
FIG. 6 is a schematic diagram illustrating an overvoltage reduction circuit associated with a high voltage power supply according to yet another aspect of the present invention.

According to yet another aspect of the present invention, an overvoltage protection circuit is disclosed for protecting against an overvoltage condition associated with the high voltage supply (e.g., 12V supply), as illustrated in FIG. 6 and designated at reference numeral 200. According to one exemplary aspect of the present invention, the overvoltage protection circuit 200 advantageously utilizes a pass FET 202 which already exists on the hard disk drive printed circuit board, however, use of such pass FET 202 is not required, and other switching components or circuits may be utilized and are contemplated as falling within the scope of the present invention.

The overvoltage reduction circuit 200 in FIG. 6 is operable to reduce the board motor voltage to the servo IC 204, the servo driver FETs 206 and the servo IC motor voltage 208 under system conditions when the 12V supply voltage 210 exceeds its rated voltage (e.g., increasing slightly above 12V). According to one exemplary aspect of the present invention, the overvoltage protection circuit 200 comprises a voltage detection circuit 220 and a voltage reduction circuit 222, respectively. The voltage detection circuit 200 is operable to detect a circuit condition in which the potential of the 12V supply 210 exceeds a predetermined level, for example, some value greater than 12V. Upon detection of such a circuit condition, the voltage detection circuit 220 provides an activation signal to the voltage reduction circuit 222 which is operable to reduce the voltage associated with the 12V supply 210 at the traces 204, 206 and 208, respectively, which supplies the supply potential to at least one of the various integrated circuit chips on the hard disk drive printed circuit board.

In accordance with one exemplary aspect of the present invention, the voltage detection circuit 220 may comprise a zener diode 230 in series with a resistor 232. In operation, under normal conditions (the supply 210 properly supplying 12V) the voltage across the zener diode 230 is reverse biased and nonconducting. Under an overvoltage condition, however, where the potential of the 12V supply 210 exceeds its rated voltage, the zener diode 230 is reverse biased and breaks down (e.g., by setting the zener breakdown voltage at about the predetermined level which is slightly greater than 12V, for example, about 13V) and current conducts therethrough. Based upon the breakdown current, the resistor 232 develops a voltage thereacross which serves as an activation signal that an overvoltage condition has been detected. Although the zener and resistor combination has been illustrated and described as one type of voltage detection circuit, other types of circuits may be employed to provide similar voltage detection functionality and any such circuitry is contemplated as falling within the scope of the present invention.

In accordance with another exemplary aspect of the present invention, the voltage reduction circuit 222 may comprise a transistor 240 such as an NPN type bipolar transistor having a control terminal coupled to the voltage detection circuit 220. The voltage reduction circuit 222 also includes the pass FET 202 having a control terminal coupled to the NPN transistor 240. The control terminal of the pass FET 202 is also coupled to supply disconnect sense circuit 250 which is operable to detect a system condition where the 12V supply has been disconnected from the hard disk drive system. Under such conditions, the sense circuit 250 turns off the pass FET 202 to enable the back EMF of the motor (not shown) to be used as a power source to park the head into its proper landing zone via the servo IC 204 in the absence of the 12V supply voltage.

The overvoltage circuit 200 operates in the following exemplary manner. Under normal operating conditions, no activation signal is provided by the voltage detection circuit 220 to the voltage reduction circuit 222, and thus the NPN transistor 240 is off. With no current conduction through transistor 240, the pass FET 202 remains conducting via the sense circuit 250 (when the sense circuit 250 does not detect an absence of the 12V supply). With the gate of the pass FET 202 high, the transistor 202 is conducting and the 12V supply potential is transmitted substantially to the trace(s) 204, 206 and 208, respectively.

Under a detected overvoltage condition, however, the voltage detection circuit 220 provides an activation signal to the base of the transistor 240, thus turning the transistor 240 on and pulling the gate of the pass FET 202 low. As the gate voltage of the pass FET 202 decreases, the pass FET 202 becomes more resistive, and a voltage drop occurs thereacross, thereby decreasing the voltage supplied by the 12V supply 210 to the trace(s) 206 and 208. The resistor 281 serves to limit power dissipation and voltage to other PCB components. In the above manner, the voltage reduction circuit 222 operates to reduce the voltage at the trace(s) 206 and 208 when an overvoltage condition at the 12V supply 210 is detected. Although FIG. 6 illustrates one exemplary voltage reduction circuit, various types of other circuit components and configurations may be employed to provide such functionality and such alternative circuits are contemplated as falling within the scope of the present invention.

In accordance with another aspect of the present invention, the overvoltage protection circuit 200 further comprises a reset circuit 260 which is operable to output a reset signal in response to a detected 12V supply overvoltage condition. According to one exemplary aspect of the present invention, the reset circuit 260 comprises a transistor 262, for example, an NPN type bipolar transistor having a control terminal coupled to the voltage detection circuit 220. When the voltage detection circuit 220 detects an overvoltage condition associated with the 12V supply 210, the activation signal (e.g., the voltage across the resistor 232) is output to the reset circuit 260. The activation signal is operable to turn the transistor 262 on and pull an output 264 thereof, labeled RESETZ down to a circuit ground potential.

According to an exemplary aspect of the present invention, RESETZ is a reset signal that goes to the hard disk drive microprocessor or ASIC controller (not shown), depending on the hard disk drive system configuration being employed, which turns off the servo motor and parks the head in its appropriate landing zone. The microprocessor or controller will then re-initiate the hard disk drive system start-up process using any one of various well known initialization procedures. Although the above reset circuit 260 is described in conjunction with a transistor 262, other circuits providing similar functionality may be employed and such alternatives are contemplated as falling within the scope of the present invention.

In the above example, the circuit 200 operates well when the 12V supply 210 experiences an overvoltage condition which is not substantially greater than the rated supply voltage of about 12V. In cases where the 12V supply potential greatly exceeds its rated voltage (e.g., about 30V), the circuit 200 has some potential limitations. For example, the diode (not shown) which is implicit in the pass FET 202 (the backgate diode) will tend to conduct when the voltage from the supply 210 is greater than the board motor voltage VM 206. Consequently, the voltage at the traces 206 and 208 will get clamped at about a backgate diode drop (e.g., about 1V) below the supply potential 210. For supply potentials not substantially greater than 12V (e.g., about 13–15V) such protection may be acceptable, however, for supply voltages substantially greater, large potentially undesirable voltages may still appear on the traces 206 and 208, respectively.

Figure 7:
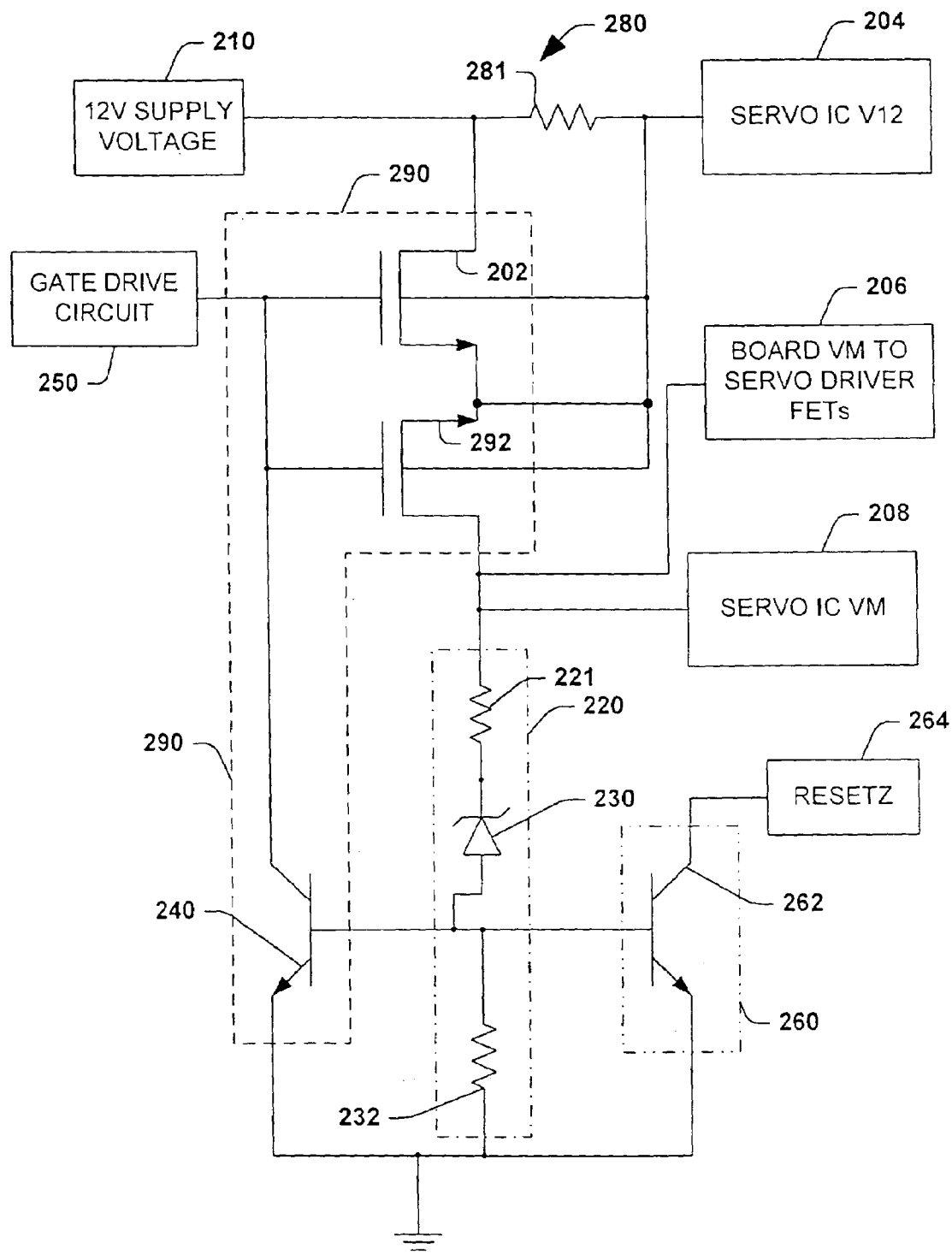
FIG. 7 is a schematic diagram illustrating an overvoltage protection circuit associated with the high voltage power supply according to still another aspect of the present invention.

According to still another aspect of the present invention, a circuit for protecting against substantial overvoltage conditions on the high voltage supply is disclosed in FIG. 7, and designated at reference numeral 280. The overvoltage protection circuit 280 is similar in many respects to the circuit 200 of FIG. 6, however, the circuit 280 of FIG. 7 has a voltage reduction circuit 290 that differs from the voltage protection circuit 222 of FIG. 6. The voltage protection circuit 290 has a second transistor 292, for example, an NMOS transistor, in series with the pass FET 202 such that their backgate diodes are coupled together in a back-to-back series fashion (e.g., cathode to cathode). In the above manner, when the 12V supply voltage 210 increases substantially above its rated voltage, although the backgate diode associated with the pass FET 202 becomes forward biased, the second backgate diode associated with the transistor 292 is reverse biased and no current conducts therethrough. Consequently, a substantial portion of the voltage is dropped across the reverse biased backgate diode of transistor 292, thus protecting the traces 206 and 208 from experiencing a potentially undesirable high voltage thereat.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. An overvoltage protection circuit, comprising:
   one or more hard disk drive integrated circuit chips residing on a board;
   a first voltage supply potential for supplying power to at least one of the one or more hard disk drive integrated circuit chips;
   a second voltage supply potential having an intended value which is less than the first voltage supply potential, the second voltage supply potential for supplying power to at least one of the one or more hard disk drive integrated circuit chips;
   a voltage detection circuit operable to detect a value of the second voltage supply potential; and
   a voltage reduction circuit operably coupled to the voltage detection circuit,
   wherein the voltage detection circuit is operable to activate the voltage reduction circuit when the second voltage supply potential exceeds a predetermined threshold, and wherein the voltage reduction circuit is operable to reduce the value of the second supply potential when activated by the voltage detection circuit,
   further comprising a reset circuit coupled to the voltage detection circuit, wherein the reset circuit is operable to activate a reset signal to a controller circuit associated with the board to reset the first and second voltage supply potentials when the voltage detection circuit detects a first voltage supply potential which exceeds an another predetermined threshold, and wherein the voltage detection circuit further comprises a resistor coupled in series with a zener diode, wherein when the zener diode has a reverse bias voltage thereacross which exceeds the predetermined threshold, the zener diode breaks down and conducts current therethrough, thereby generating a voltage across the resistor, and wherein when the voltage across the resistor exceeds a predetermined level, the voltage activates the voltage reduction circuit.

2. The overvoltage protection circuit of claim 1, further comprising a first transistor coupled between the second voltage supply potential and a trace which transmits the second voltage supply potential to at least one of the one or more hard disk drive integrated circuit chips, and wherein the first transistor has a control terminal coupled to the first voltage supply potential, and wherein the voltage reduction circuit comprises a second transistor coupled to the control terminal of the first transistor and having a control terminal coupled to the resistor of the voltage detection circuit, wherein when the voltage across the resistor in the voltage detection circuit exceeds the predetermined level, the second transistor turns on and lowers a voltage of the control terminal of the first transistor, thereby reducing a conduction of the first transistor and reducing a voltage value provided by the second voltage supply potential to the trace.

3. An overvoltage protection circuit, comprising:
one or more hard disk drive integrated circuit chips residing on a board;
a first voltage supply potential for supplying power to at least one of the one or more hard disk drive integrated circuit chips;
a second voltage supply potential having an intended value which is less than the first voltage supply potential, the second voltage supply potential for supplying power to at least one of the one or more hard disk drive integrated circuit chips;
a voltage detection circuit operable to detect a value of the first voltage supply potential; and
a voltage reduction circuit operably coupled to the voltage detection circuit,
wherein the voltage detection circuit is operable to activate the voltage reduction circuit when the first voltage supply potential exceeds a predetermined threshold, and wherein the voltage reduction circuit is operable to reduce said value of the first supply potential when activated by the voltage detection circuit,
further comprising a reset circuit coupled to the voltage detection circuit, wherein the reset circuit is operable to activate a reset signal to a controller circuit associated with the board to reset the first and second voltage supply potentials when the voltage detection circuit detects a first voltage supply potential which exceeds the predetermined threshold,
wherein the voltage reduction circuit comprises:
a first transistor having a backgate diode associated therewith; and
a second transistor having a backgate diode associated therewith,
wherein the first and second transistor are coupled together in series in such a manner that the backgate diodes are oriented with respect to one another in a back-to-back fashion, thereby preventing conduction therethrough under overvoltage conditions when the first and second transistors are biased in a substantially resistive condition based on an activation signal from the voltage detection circuit.

4. The overvoltage protection circuit of claim 3, wherein a back-to-back orientation of the backgate diodes comprises a configuration where a cathode terminal of the backgate diodes are coupled together or a configuration where an anode terminal of the backgate diodes are coupled together.

5. An overvoltage protection circuit for a hard disk drive circuit board, comprising:
one or more hard disk drive integrated circuit chips residing on the board;
a first voltage supply potential for supplying power to at least one of the hard disk drive integrated circuit chips;
a second voltage supply potential for supplying power to at least one of the hard disk drive integrated circuit chips, wherein the second voltage supply potential has an intended value which is less than the first voltage supply potential;
a first transistor coupled between the first voltage supply potential and a trace for transmitting the first voltage supply potential to the at least one hard disk drive integrated circuit chip, wherein when the first transistor is substantially conducting, the first voltage supply potential is transmitted substantially to the trace, and wherein when the first transistor is not conducting substantially, a substantial voltage drop exists thereacross and a voltage potential transmitted to the trace is less than the first voltage supply potential;
a zener diode coupled to the first transistor and operable to be reverse biased and nonconducting when a value of the first voltage supply potential is less than a predetermined level, and wherein the zener diode is operable to break down and conduct current therethrough when the value of the first voltage supply potential is greater than or equal to the predetermined level;
a resistor coupled in series with the zener diode and operable to exhibit a voltage thereacross when the zener diode is conducting current; and
a second transistor coupled between the control terminal of the first transistor and one terminal of the resistor, and a control terminal of the second transistor coupled to the other terminal of the resistor, wherein when the zener diode conducts current due to the first voltage supply potential exceeding the predetermined level, a voltage develops across the resistor and causes the second transistor to conduct, and wherein the conduction of the second transistor causes a conduction of the first transistor to be reduced, thereby reducing the voltage at the trace,
further comprising a reset circuit coupled to a voltage detection circuit, wherein the reset circuit is operable to activate a reset signal to a controller circuit associated with the board to reset the first and second voltage supply potentials when the voltage detection circuit detects a first voltage supply potential which exceeds the predetermined level.

6. The overvoltage protection circuit of claim 5, further comprising a third transistor coupled in series between the first transistor and the zener diode, and wherein the first and third transistors have backgate diodes associated therewith in which the backgate diodes are oriented in a back-to-back configuration, thereby preventing conduction therethrough when the first and third transistors are biased in a substantially resistive condition based on an activation of the second transistor when an overvoltage condition is detected.

* * * * *